R. GUYOT-SIONNEST.
ARRANGEMENT OF REVERSING GEAR FOR MOTORS WITH VALVE GEAR WORKED BY CAMS.
APPLICATION FILED JUNE 12, 1918.
1,359,500. Patented Nov. 23, 1920.
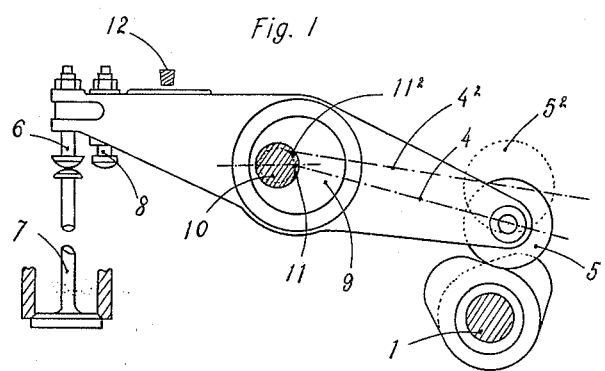
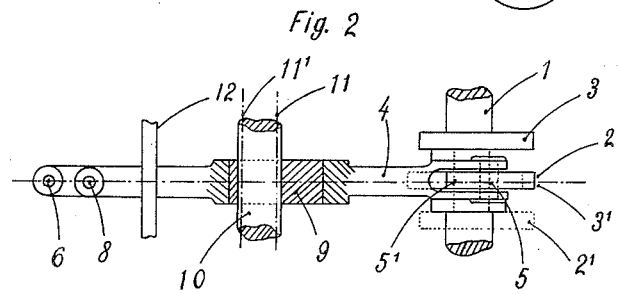
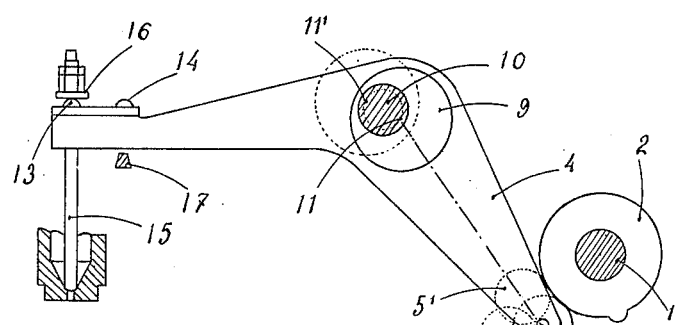
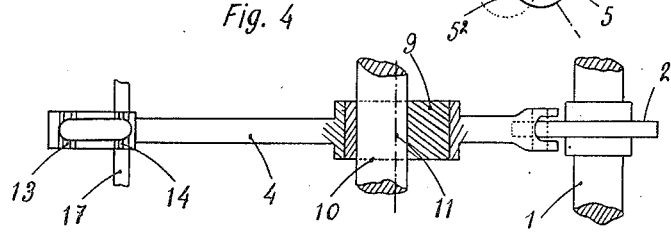

UNITED STATES PATENT OFFICE.

RENÉ GUYOT-SIONNEST, OF PARIS, FRANCE, ASSIGNOR TO SOCIETE DES ANCIENS ETABLISSEMENTS WEYHER ET RICHEMOND, OF PANTIN, FRANCE, A CORPORATION OF FRANCE.

ARRANGEMENT OF REVERSING-GEAR FOR MOTORS WITH VALVE-GEAR WORKED BY CAMS.

1,359,500.   Specification of Letters Patent.   Patented Nov. 23, 1920.

Application filed June 12, 1918. Serial No. 239,649.

*To all whom it may concern:-*

Be it known that I, RENÉ GUYOT-SIONNEST, engineer, of 95 Rue Jouffroy, at Paris, Department of the Seine, in France, citizen of the French Republic, have invented certain new and useful Improvements in the Arrangement of Reversing-Gear for Motors with Valve-Gear Worked by Cams; and I do hereby declare the following to be a full, clear, and exact description of the invention, such as will enable others skilled in the art to which it appertains to make and use the same.

This invention relates to motors in which the distributing device or devices, usually one or more valves, are worked by cams mounted upon a shaft revolving at a suitable speed, through the medium of levers oscillating about axes parallel to the cam shaft.

The object of the invention is to permit, by simple means, the adjustment of the valve gear so as to cause the motor to rotate, either in one direction or in the reverse direction, and it will be in particular of great utility in its application to internal combustion or explosion motors employed in the propulsion of ships.

The invention is characterized by the fact that the shaft about which the lever oscillates has two different positions, one of which corresponds to forward gear and the other to the reverse gear and that the turning movement which brings this shaft out of one of these positions into the other, has the effect of shifting the corresponding end of the lever away from the cam shaft, all subsequent relative movement of the lever relatively or with respect to the cams in whatever direction it may take place running no risk of being impeded or interfered with by the meeting of the lever with the projecting part of the cam or cams.

The invention is described hereinafter in detail with reference to the annexed drawing which represents by way of example and diagrammatically two methods of construction of the arrangement relating to the operation of various valves of Diesel motors.

Figure 1 is an elevation.

Fig. 2 is a plan view representing an applicable form of construction, in particular to the inlet and exhaust valves of a four stroke cycle Diesel motor.

Figs. 3 and 4 represent, the first in elevation and the second in plan, a second constructional form applicable more especially to the operation of a valve opening downward as the fuel injection needles generally do in Diesel motors.

In the drawing:

1 is the cam shaft, 2 and 3 are cams mounted upon this shaft one being arranged for forward gear and the other for the reverse gear.

4 is the lever represented in the position corresponding to forward gear; 5 is a roller carried by the lever 4 and worked by the cam 2; 6 is a contact stud which serves to move the valve 7 and 8 is another contact stud of a similar kind the use of which will be seen hereafter.

The lever 4 oscillates about an eccentric 9 keyed on a shaft 10 parallel with the cam shaft; the axis of the eccentric is at 11.

12 is a fixed piece which opposes the lifting of the part of the lever beside the valve.

When it is desired to pass from forward gear to reverse gear, the shaft 10 is caused to rotate through a certain angle which is supposed to be 180°. In this movement the shaft of the eccentric commences to rise carrying the lever with it. This latter comes in contact with the fixed piece 12 which opposes all elevation of this part of the lever beside the valve and the other end and the roller 5 therefore move away from the cam shaft; $11^2$, $4^2$, $5^2$ (see Fig. 1) represent the positions of the shaft of the eccentric, of the lever, and of the roller at the moment in which the movement has just commenced; it will be easily seen that at this moment all relative movement of the roller with respect to the cams is in no danger of being impeded by the projecting parts of these latter.

While the roller is raised, the two cams 2 and 3 are moved longitudinally either by sliding on the cam shaft or by movement of this shaft itself, so as to bring the cam 3 to 3' in place of the cam 2 which moves to 2'.

A device, not shown, insures this movement and is adjusted in conjunction with the rotary movement of the shaft 10, so that the two movements may take place in the order indicated.

At the end of the movement the shaft of the eccentric and the roller assume the positions 11′ and 5′ (see Fig. 2). The roller falls on to the cam 3 now at 3′ and arranged for backward gear. The contact stud 8 is substituted for the contact stud 6 to operate the valve.

In the second constructional form (see Figs. 3 and 4) the lever 4 which is of a form suited to its use, rocks about an eccentric 9 the axis of which is at 11 and which is keyed on the shaft 10, the latter being adapted to receive a rotary movement. The lever carries at one of its ends two projecting parts 13 and 14, one of which serves for forward gear and the other for the reverse gear and which are adapted to lift the fuel needle 15 through the medium of a washer 16. A fixed piece 17 opposes the lowering of the part of the lever beside the fuel needle and plays a similar part to that of the piece 12 in the preceding example.

A single cam 2 serves for both forward and reverse gears but, owing to the rotation of the shaft 10, the roller 5, after being moved away from the cam and being passed to the position $5^2$ without being hindered in its movement by the projecting part of this cam, proceeds to occupy a fresh position 5′ in such a way that the adjustment to backward gear is correctly made.

I claim:

In a device of the class described, the combination with a valve operating lever, of an eccentrically adjustable fulcrum for said lever, means co-acting with one end of the lever to oscillate the same, the relation of which to said end of the lever is varied upon the adjustment of the fulcrum, and means for limiting the movements of the opposite end of the lever in the direction of the movement of the first end.

In testimony whereof I affix my signature in presence of two witnesses.

RENÉ GUYOT-SIONNEST.

Witnesses:
   FRANCISCO JACOMET,
   CHAS. P. PRESSLY.